United States Patent [19]

Bliss et al.

[11] 3,792,495

[45] Feb. 12, 1974

[54] ELECTROSTATIC RECORDER EMPLOYING THREE VOLTAGE LEVEL SWITCHING BETWEEN THE STYLUS ELECTRODES AND THE BACKPLATE SECTIONS

[75] Inventors: Arthur E. Bliss, Sunnyvale; Edward W. Marshall, Saratoga, both of Calif.

[73] Assignee: Varian Associates, Palo Alto, Calif.

[22] Filed: Mar. 31, 1972

[21] Appl. No.: 240,043

[52] U.S. Cl. .......... 346/74 ES
[51] Int. Cl. .......... G01d 15/06
[58] Field of Search.. 346/74 ES, 74 S, 74 SB, 74 P; 101/DIG. 13; 178/6.6 A

[56] References Cited

UNITED STATES PATENTS

| | | | |
|---|---|---|---|
| 3,564,556 | 2/1971 | Tsukatani | 346/74 ES |
| 3,653,065 | 3/1972 | Brown, Jr. | 346/74 ES |
| 3,196,451 | 7/1965 | Jones | 346/74 ES |

*Primary Examiner*—Bernard Konick
*Assistant Examiner*—Jay P. Lucas
*Attorney, Agent, or Firm*—Stanley Z. Cole; Paul Hentzel

[57] ABSTRACT

Two backplate voltages and two stylus electrode voltages are provided for an electrostatic recorder employing backplate switching and stylus electrode switching. The magnitudes of the four voltages establish an increasing progression, having a difference therebetween of slightly less than the threshold writing voltage $V_T$ (that voltage required to establish writing in the electrostatic recorder). The difference between the lowest voltage and the second lowest voltage is designated $V_t$. The difference between the lowest voltage and the third voltage is $2V_t$, and the difference between the lowest and the highest voltage is about $3V_t$. These three voltage differences or levels are established between the stylus electrodes and the backup plates in such a manner that the voltage between the stylus selected to write and its backplate is $3V_t$; and the voltages between the remaining stylus electrodes and the adjacent backup plates is only $V_t$, which is slightly less than $V_T$ and is insufficient to cause writing. The voltage applied for writing, $3V_t$, is almost three times the threshold voltage $V_T$, and establishes good contrast writing without ghosting from the nonselected stylus electrodes.

7 Claims, 3 Drawing Figures

ELECTROSTATIC RECORDER EMPLOYING THREE VOLTAGE LEVEL SWITCHING BETWEEN THE STYLUS ELECTRODES AND THE BACKPLATE SECTIONS

FIELD OF THE INVENTION

This invention relates to electrostatic recording and more particularly to electrostatic recording employing backplate switching.

DESCRIPTION OF THE PRIOR ART

Heretofore electrostatic recorders employing bi-level stylus switching consisted of an array of stylus electrodes mounted proximate a one piece backup electrode with a charge retentive recording medium or web therebetween. The backup electrode was maintained at a potential in excess of $V_T$, about $2V_t$. Each stylus electrode had a switching device connected thereto for applying ground potential on the electrode selected to write and $V_t$ on all the remaining electrodes. The writing voltage ($V_w$) appearing between the backplate and the electrodes selected to write was $2V_t$ and was substantially greater than the threshold voltage $V_T$ required to produce charge transfer between the selected stylus and the recording medium. The excess of $V_w$ over $V_T$ insured that a high intensity charge transfer to form the image portions on the web, which when toned, produce a clear dark image with good contrast. $V_w$ for this prior art device was limited to the switching capacity of stylus switching devices. Switching devices of higher switching capacity were formed by series connected transistors.

A bi-level backplate switching recorder was introduced to minimize the number of switching devices required to activate stylus electrodes. The backup plate was divided into sections, each section defining a group of stylus electrodes proximate thereto. Each stylus may have either 0 voltage or $V_t$ applied thereto. The voltage applied is controlled by stylus switching devices connected to the stylus electrodes in response to input signals. The stylus electrodes are switched or activated in sets, each set consisting of a single stylus from each backup plate group. Similarly, backplate sections may be at one of two potentials, $V_t$ or $2V_t$. The particular voltage appearing on each section is determined by a backplate switching device in response to input signals. $V_t$ is slightly less the threshold writing voltage $V_t$ to prevent ghost writing from the non-selected styli.

In operation, $2V_t$ is applied to the backup plate proximate the electrode selected to write causing charge transfer to the web. All other backplate sections are maintained at a potential of $V_t$. The set of stylus electrodes including the stylus electrode selected to write are established at 0 potential. All other stylus electrode sets have $V_t$ applied thereto. The voltage difference between the non-selected stylus and the backplate section proximate thereto is 0 or $V_t$, which is insufficient to cause charge transfer.

A disadvantage of the bi-level prior art systems is that the maximum writing potential obtainable is $2V_t$. If the potential between the selected stylus and the backplate is increased beyond this, ghost writing will occur between the remaining stylus which are at $V_t$ potential.

SUMMARY OF THE INVENTION

It is therefore an object of this invention to: provide an electrostatic recorder employing backplate switching having a higher writing contrast without ghosting; provide an electrostatic recorder employing backplate switching in which the writing potential is $3V_t$; provide an electrostatic recorder employing backplate switching in which all of the non-selected styli have the same electrical stress between that styli and the associated backup plate; and provide an electrostatic recorder in which the backplate voltages are adjustably ganged to provide a contrast control.

BRIEF DESCRIPTION OF THE DRAWING

Further objects and advantages of tri-level electrostatic recorder and the operation thereof will become apparent from the following detailed description taken in connection with the drawings in which:

FIG. 1 shows the tri-level switching electrostatic recorder 10 of the present invention which is similar in structure to the prior art bi-level backplate switching recorder. In FIG. 1, four separate voltages are employed as the two stylus electrode voltages and the two backup plate voltages. A high and a low stylus electrode voltage are employed, 0 and $2V_t$ respectively. Similarly, a high and a low backup plate voltage are employed, $V_t$ and $3V_t$, respectively.

The styli or writing electrodes 12 are mounted in an array and positioned proximate the charge retentive surface of a dielectric coat paper or web 14. A backplate 16 is mounted proximate the other side of web 14 spaced from styli 12 to permit passage of web 14. The gap between stylus 12 and web 14 is the major factor in determining $V_t$, which in the preferred embodiment is about 250 volts. Backplate 16 is divided into sections a-d. More or fewer backplate sections may be employed, four are shown for convenience. Each backplate section 14 a-d defines a group of styli 12 proximate thereto. In FIG. 1 six styli $A_1$-$F_1$ are associated with section 16, styli $A_2$-$F_2$ are associated with section 16b, etc. Six styli are shown in each group for convenience. In actual practice a much greater number of styli are in each group.

Figure 1:
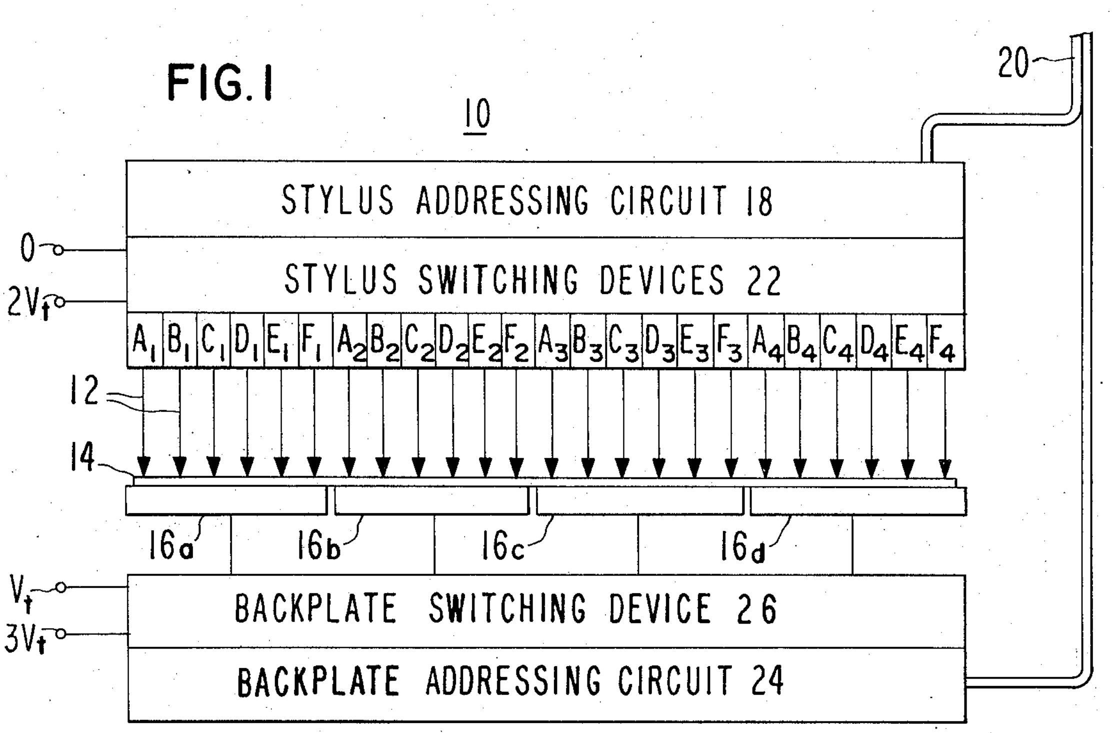
FIG. 1 is the present electrostatic recorder employing tri-level backplate switching.

Styli 12 are selected in sets by a stylus addressing circuit 18 in response to input signals at input 20. Each set consists of one styli from each group. Stylus $A_1$ to $A_4$ form a set, stylus $B_1$ to $B_4$ form another set, etc. The stylus electrode voltages 0 and $2V_t$ are applied to styli 12 by stylus switching devices 22. Ground potential is applied to the set of styli which contains the styli selected to write, and $2V_t$ is applied to all of the styli in the remaining, non-selected sets.

Backplate sections 16 are selected by a backplate addressing circuit in response to input signals at input 20. The backplate voltages $V_t$ and $3V_t$ are applied to backplate sections 16 *a-d* by a backplate switching circuit 26. $3V_t$ is applied to the section associated with the stylus selected to write, and $V_t$ is applied to the remaining, non-selected sections.

Figures 2, 3:
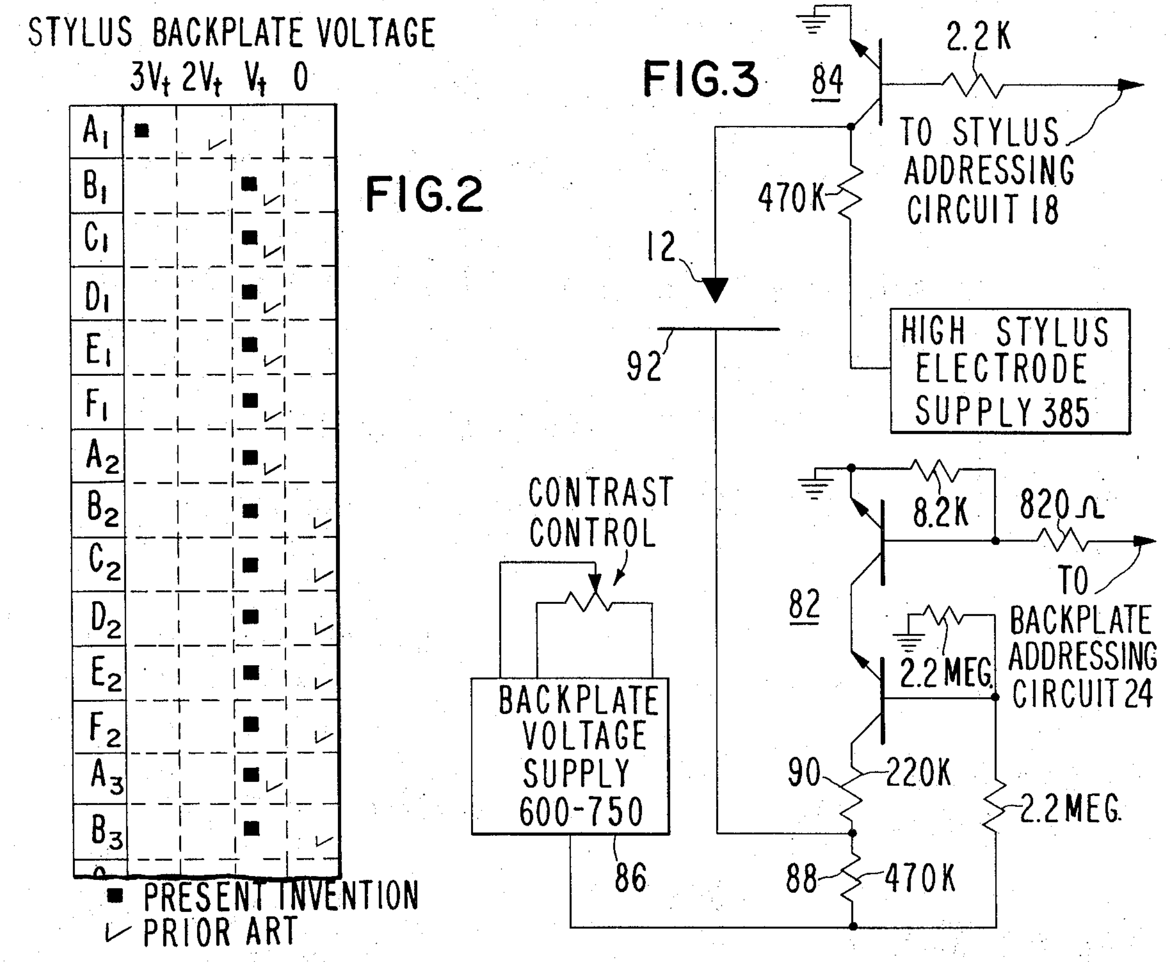
FIG. 2 is a chart comparing the voltage appearing between each stylus electrode and associated backplate of the prior art device (checks) and the present invention of FIG. 1 (solid squares)
FIG. 3 is an embodiment of the switching circuits of FIG. 1 showing an adjustable backplate voltage and a voltage divider for establishing $V_t$ and $3V_t$.

Assuming that stylus $A_1$ has been selected to write, the 0 stylus voltage is applied to the A set of stylus electrodes, and the 2$V_t$ stylus electrode voltage is applied to all of the remaining sets of writing electrodes B through F. The 3$V_t$ plate voltage is applied to plate 16a which is proximate the stylus group containing stylus $A_1$; and the $V_t$ plate voltage is applied to all the remaining plates which are proximate to the remaining groups of electrodes. The resulting voltages between each stylus and its corresponding backplate is shown in the chart of FIG. 2 by a solid square. Only Stylus $A_1$ has a voltage sufficient to write, 3$V_t$. All of the remaining styli have $V_t$ between it and the proximate backup plate. The resulting improvement is two-fold. First, the writing voltage is 3$V_t$ as opposed to 2$V_t$ disclosed in the prior art bi-level backplate switching device. This increased writing voltage increases the intensity of the charge transferred between the selected electrode and the charge retentive surface of web 14, thus improving the contrast of the ultimate writing. Further, all of the remaining styli have the same electric stress caused by $V_t$ established between it and the proximate backplate section. In the prior art device this electric stress was non-uniform. At certain styli the electrode-backplate stress was 0 and at other styli electrode-backplate stress was $V_t$.

It is not necessary that the stylus electrode voltages be 0 and 2$V_t$, nor that the backplate voltages be $V_t$ and 3$V_t$. It is only required that the lowest potential (0 in this case) and the highest potential (3$V_t$ in this case) be on opposite sides of the recording medium. These potentials are the ones that establish the writing voltage of 3$V_t$. $V_t$ and 2$V_t$ may be either stylus electrode voltages or backplate voltages. The following chart shows possible arrangements of high and low voltages applied to the tri-level recorder of FIG. 1:

| | Case 1 | Case 2 | Case 3 | Case 4 |
|---|---|---|---|---|
| low stylus voltage | 0 | 0 | $2V_t$ | $V_t$ |
| high stylus voltage | $2V_t$ | $V_t$ | $3V_t$ | $3V_t$ |
| low backplate voltage | $V_t$ | $2V_t$ | 0 | 0 |
| high backplate voltage | $3V_t$ | $3V_t$ | $V_t$ | $2V_t$ |

It is preferred that the voltage between adjacent styli and between adjacent plates be kept at a minimum to reduce breakdown stress therebetween. This condition is met by the progressively increasing voltage arrangement of Case 2 and the progressively decreasing voltage arrangement of Case 3.

The present tri-level switching technique employes three voltage differences, $V_t$, 2$V_t$ and 3$V_t$, which are generated by four voltage sources, 0, $V_t$, 2$V_t$ and 3$V_t$. The actual magnitude of the voltage sources employed is not determinative, it is the difference between the voltage sources that must establish the $V_t$, 2$V_t$ and3$V_t$ switching levels. Because it is convenient to use 0 volts as one of the voltages applied, the values of the applied voltages become equal to the voltage difference required to establish the switching level. It is not necessary that 0 be employed as one of the voltages, in which case the differences between the four voltage sources would establish the three required levels but would not be equal thereto.

$V_T$ is a function of the spacing between the stylus and the dielectric surface, the conductivity of the recording medium, the atmospheric pressure and humidity, and the shape of the electrode and the relaxation time of the web. Even in the same recorder, different paper or different atmospheric conditions will cause $V_T$ to vary.

It is preferred that the voltage sources be adjustable to accommodate these variables and provide the optimum $V_t$, 2$V_t$ and 3$V_t$ for establishing the maximum contrast. Further, the adjustable voltage source provides a general contrast control for asthetic purposes.

Referring to FIG. 3 there is shown a preferred circuit 80 for providing the two backplate voltages $V_t$ and 3$V_t$ and the two stylus electrode voltages 0 and 2$V_t$ through switching devices 82 and 84. A variable power supply 86 provides the 3$V_t$ (over of range 600 – 750 V). The 3$V_t$ voltage is applied to switching device 82 through voltage dividing resistors 88 and 90. When backplate 92 is selected, switching device 82 is turned OFF and the entire 3$V_t$ from supply 86 appears on backplate 92. Resistors 88 and 90 are proportioned so that when switching device 82 is ON, $V_t$ (over a range of 200 – 350) appears on backplate 92 in general correspondence to the equation:

$$V_t = (R90)\,(3V_t)/(R88 + R90)$$

The preferred values of R88 and R90 are about 470 K and 220 K respectively. The high values for these voltage divider resistors permit R88 to function as a current limiting resistor if stylus 12 becomes shorted to backplate 92. The series connected transistors in backplate switching device 82 provide a higher switching capacity to handle the 600 – 750 volts applied thereacross when the transistors are OFF.

The voltage on stylus 12 is determined by the conductive state of switching device 84. When stylus 12 is selected, switching device 84 is turned ON and ground potential is applied to stylus 12. Otherwise, switching device 84 is OFF and 385 volts (approximately 2$V_t$) appears on stylus 12. 385 volts is the switching capacity of a single transistor. To simplify the circuit, this voltage, corresponding to 2$V_t$, is not adjustable to control the contrast. Only the voltage on backplate 92 is adjustable to maximize the contrast without ghost writing.

Clearly, various changes may be made in the structure and embodiments shown herein without departing from the concept of the present invention. For example, other means may be employed to provide the two backplate voltages and the two stylus voltages. Further, the stylus switching device include series connected transistors to increase its switching capacity. The stylus voltage source may then be varied over a range of for example 400 – 550 volts to increase the adaptability of recorder 10 to various webs, different environments and changing stylus-backplate gaps.

We claim as our invention:

1. An electrostatic recorder for establishing a charge image on the charge retentive surface of a recording medium in response to a sequence of input signals, the combination comprising:

a plurality of stylus electrodes proximate the charge retentive surface of the recording medium;

a backplate having a plurality of sections proximate the other side of the recording medium, each section defining a group of stylus electrodes proximate thereto, the backplate spaced from the stylus electrode establishing a gap therebetween to permit passage of the recording medium and to define a threshold writing potential below which no charge is transferred from the stylus electrodes to the charge retentive surface;

backplate addressing means responsive to the sequence of input signals for selecting one backplate section;

stylus electrode addressing means responsive to the sequence of input signals for selecting a set of stylus electrodes consisting of one stylus electrode from each group, the stylus selected to write being the stylus in the selected set which is also a stylus in the group of the selected backplate section;

a stylus electrode voltage source for providing a high stylus electrode voltage and a low stylus electrode voltage;

a stylus electrode switching means for applying one of the stylus electrode voltages to the selected set of stylus electrodes and for applying the other stylus electrode voltage to the remaining styli;

a backplate voltage source for providing a high backplate voltage and a low backplate voltage;

a backplate switching means for applying one of the backplate voltages to the selected backplate and for applying the other backplate voltage to the remaining backplate sections;

the magnitude of the high and low stylus electrode voltages and the magnitude of the high and low backplate voltages forming a progression of increasing voltages each of which differ from the adjacent voltage by a voltage slightly less than the threshold writing voltage; and the switching means applying the greatest voltage difference of the voltages from the voltage source across the selected backplate and the stylus selected to write causing charge transfer, this voltage being slightly less than three times the threshold writing voltage, and the switching means applying a voltage difference less than the threshold writing potential across the remaining styli and backplate sections.

2. The electrostatic recorder of claim 1, wherein the magnitudes of the voltages applied by the voltage sources descend in the following order, first the high backplate voltage, second the high stylus electrode voltage, third the low backplate voltage, and fourth the low stylus electrode voltage, and the writing voltage applied between the selected stylus and the selected backplate is the difference between the high backplate voltage and the low stylus electrode voltage.

3. The electrostatic recorder of claim 1, wherein the low stylus electrode voltage is zero with respect to ground, and wherein the high backplate voltage is generally slightly less than 3 times the threshold writing voltage.

4. The electrostatic recorder of claim 1, wherein the backplate voltage source includes a voltage divider for providing to the high backplate voltage and the low backplate voltage, and wherein the backplate switching means has a conducting and a non-conducting state and is electrically connected in series with the voltage divider to provide the high backplate voltage to the backplate when the switching device is non-conducting and to provide the low backplate voltage to the backplate when the switching device is conducting.

5. The electrostatic recorder of claim 4, wherein the stylus electrode switching device has a conducting and a non-conducting state and connects the stylus to ground potential when in the conducting state and connects the stylus electrode to the high stylus electrode voltage when in the non-conducting state.

6. The electrostatic recorder of claim 1, wherein the backplate voltage is adjustable to provide a range of high backplate voltages and low backplate voltages for controlling the charge intensity of the charge image.

7. A method of electrostatically recording to form a charge image on the charge retentive surface of a recording medium in response to a sequence of input signals, the method comprising the steps of:

providing a high and a low stylus electrode voltage and providing a high and a low backplate voltage, the magnitude of the voltages differing in steps of less than the threshold writing voltage to establish three voltage levels generally corresponding to a voltage slightly less than the threshold writing potential, a voltage slightly less than 2 times the threshold writing potential, and a voltage slightly less than 3 times the threshold writing potential;

applying the high stylus electrode voltage to certain stylus electrodes and applying the low stylus electrode voltage to the remaining stylus electrodes;

applying the high backplate voltage to one of the backplate sections and applying the low backplate voltage to the remaining backplate sections;

whereby the voltage level of slightly less than 3 times the threshold writing potential is established between one stylus and the backplate section proximate thereto, and the voltage level of slightly less than the threshold writing potential is established between all of the remaining styli and the backplate sections proximate thereto.

* * * * *